INVENTOR
PAUL J. KAVENY

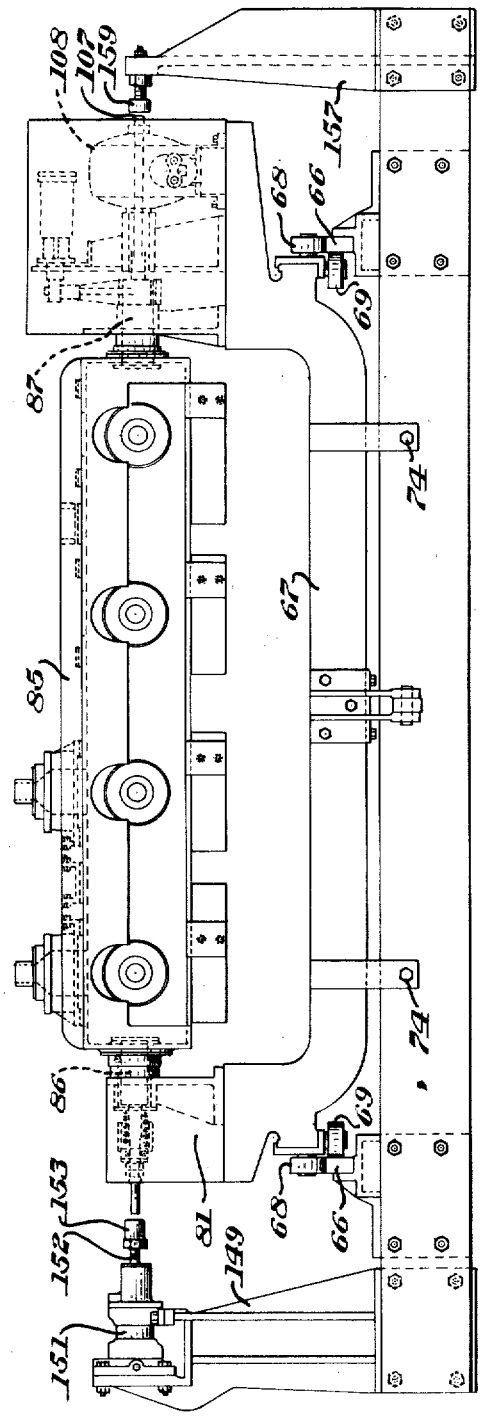

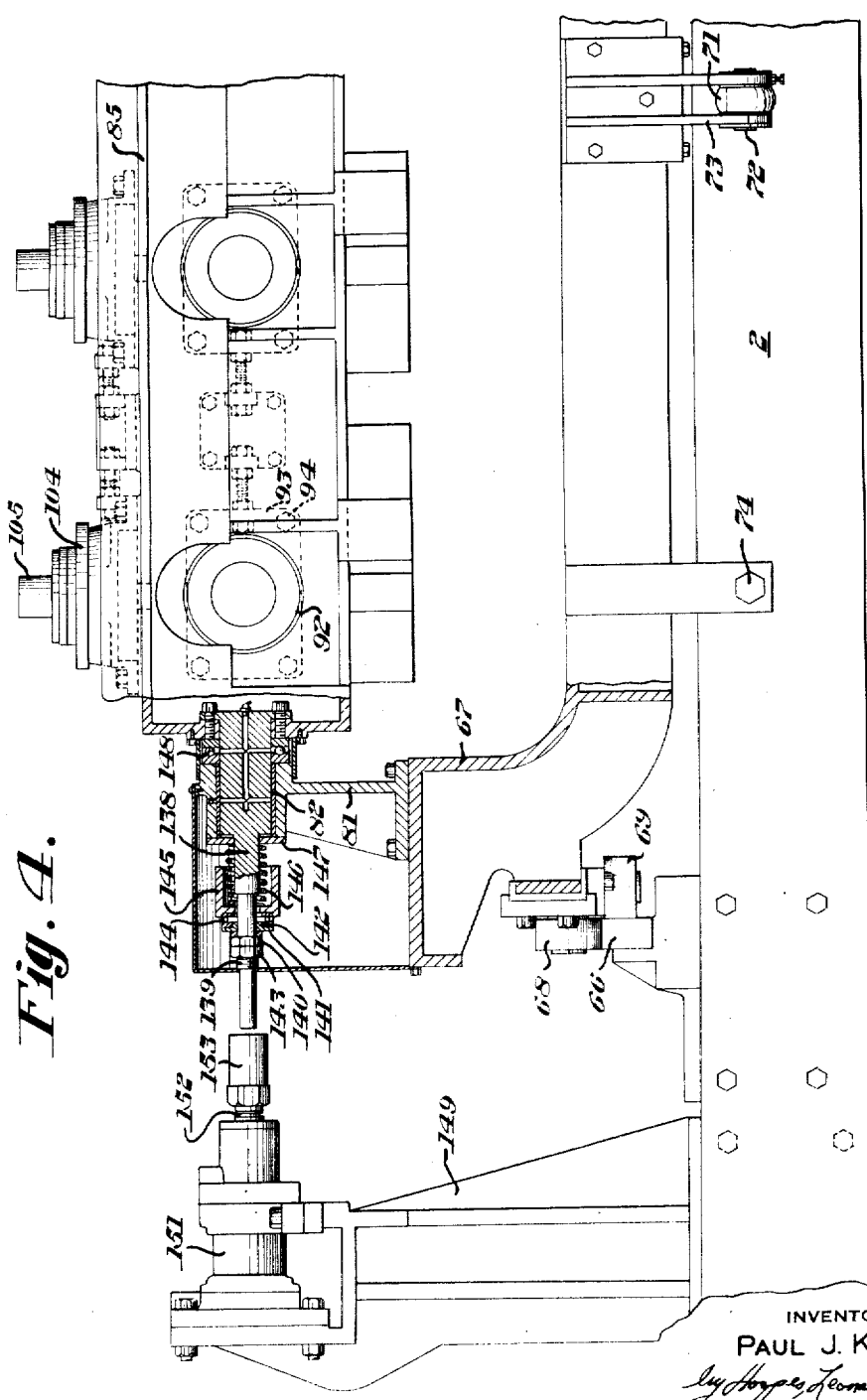

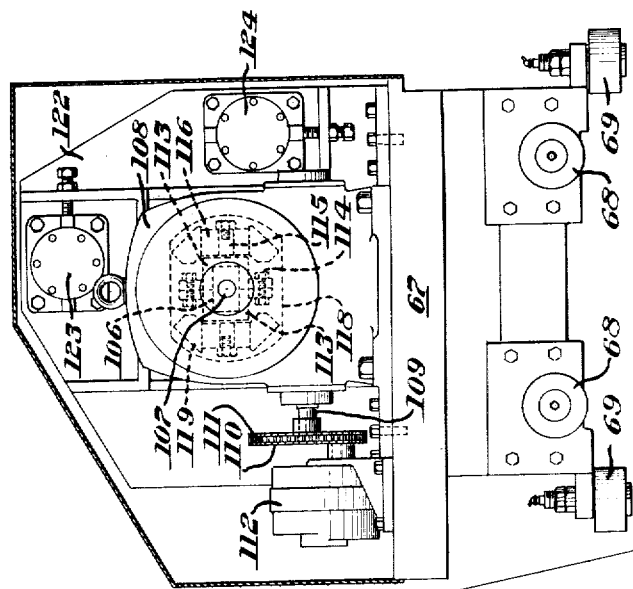
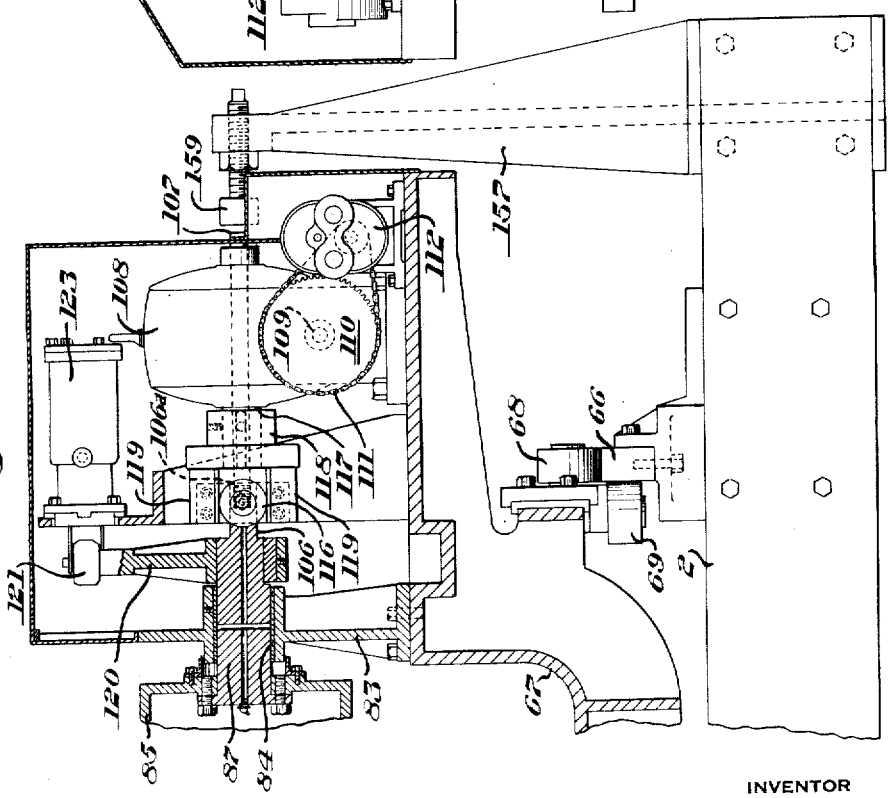

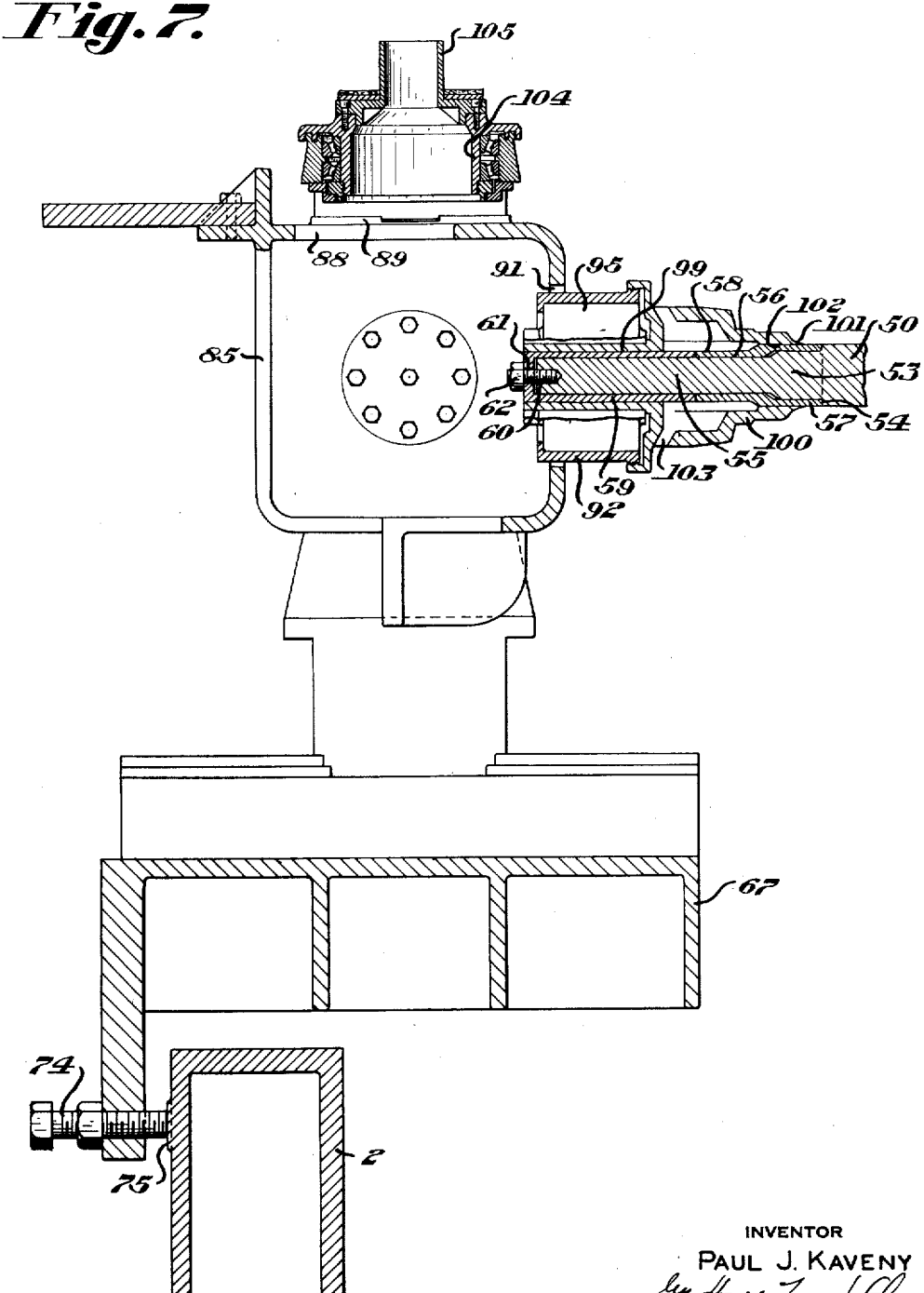

June 25, 1957  P. J. KAVENY  2,796,645
METHOD OF FORMING A MOLD OF COMPACTED MATERIAL
Filed April 30, 1952  8 Sheets-Sheet 7

INVENTOR
PAUL J. KAVENY

United States Patent Office 2,796,645
Patented June 25, 1957

2,796,645

METHOD OF FORMING A MOLD OF COMPACTED MATERIAL

Paul J. Kaveny, Zelienople, Pa., assignor to Herman Pneumatic Machine Company, Pittsburgh, Pa., a corporation of Pennsylvania Application April 30, 1952, Serial No. 285,214

6 Claims. (Cl. 22—200.5)

This invention relates to a foundry process and particularly to a foundry process for making a mold for the centrifugal casting of double hub pipe and the centrifugal casting of double hub pipe in the mold.

Double hub pipe is pipe each length of which has a hub or bell at each end thereof. The making of double hub pipe presents problems which are entirely foreign to the making of single hub pipe. In the making of double hub pipe enlargements must be formed in the mold adjacent both ends thereof and cores must be positioned in both of the enlargements to form the two hubs. Vexing problems are presented in applying the cores and maintaining them in position and making provision for ejection of the pipe from the mold.

I have devised a foundry process comprising forming in a flask a hollow mold of compacted mold forming material, forming enlargements in the mold adjacent both ends thereof, supporting partially extraneously of the mold cores in both of said enlargements, rotating the flask, mold and cores with the axis of the flask generally horizontal, introducing into the mold molten material to form by centrifugal action a hollow elongated article with enlargements adjacent both ends, thereafter discontinuing supporting partially extraneously of the mold in the corresponding enlargement at least one of the cores and thereafter ejecting the hollow elongated article by applying lengthwise pressure thereto at an end of the mold adjacent which said last mentioned enlargement is positioned. I preferably discontinue supporting partially extraneously of the mold in the corresponding enlargement at least one of the cores while the axis of the flask is still horizontal. I desirably discontinue supporting partially extraneously of the mold in the respective enlargements both of the cores prior to ejection of the hollow elongated articles. It is advantageous prior to ejection of the hollow elongated article to swing the flask into a position with its axis generally upright and with an end of the mold adjacent which said above mentioned enlargement is positioned disposed upwardly, whereafter the hollow elongated article is ejected by applying lengthwise pressure thereto at the upper end thereof.

The cores are held by core holders which are movable into and out of positions in which the respective cores are supported in the enlargements of the mold. The cores are normally supported partially by the core holders and partially by the mold. Movement of a core holder out of core supporting position results in discontinuing supporting partially extraneously of the mold in the corresponding enlargement of the mold the core held by that core holder. When a core holder is thus removed the core may or may not be removed with the core holder. Normally the core will not be removed with the core holder but will remain in the end of the hollow elongated article. The core may easily be disintegrated when the hollow elongated article is ejected from the mold so it is not important whether or not the core is removed with the core holder.

I have further devised a foundry process comprising forming in a flask a hollow mold of compacted mold forming material with enlargements adjacent both ends thereof, positioning cores in both of said enlargements, rotating the flask, mold and cores with the axis of the flask generally horizontal, introducing into the mold molten material to form by centrifugal action a hollow elongated article with enlargements adjacent both ends and thereafter ejecting the hollow elongated article from the flask, all the foregoing operations being performed at a single station. In a preferred procedure I fill a flask with finely divided mold forming material, rotate the flask to partially compact the mold forming material by centrifugal action, while the flask is rotating form a finished mold with enlargements adjacent both ends thereof, position cores in both of the enlargements, introduce into the rotating mold molten material to form by centrifugal action a hollow elongated article with enlargements adjacent both ends and eject the hollow elongated article from the flask. The flask may be filled through the upper end thereof when in generally upright position whereafter it may be swung into position with its axis generally horizontal. After formation of the hollow elongated article with enlargements adjacent both ends the flask may be swung to its former upright position and the hollow elongated article ejected from the flask through its lower end.

My foundry process can be practiced by the use of many different forms of apparatus. One form of apparatus which may be employed in the practice of my process is disclosed and claimed in my copending application Serial No. 565,367, filed February 14, 1956. Purely for purposes of explanation and illustration I have shown the same apparatus in the present application.

Details, objects and advantages of my foundry process not specifically mentioned above will become apparent as the following description of a present preferred method of practicing the same and of one form of apparatus upon which the process may be practiced proceeds.

In the accompanying drawings I have shown one form of apparatus upon which my foundry process may be practiced in which:

Figure 3 is an end elevational view of the apparatus as shown in Figure 1 as viewed from the left-hand end of that figure;

Figure 4 is a fragmentary view of the apparatus partly in transverse cross section and partly in end elevation;

Figure 5 is a view similar to Figure 4, the part of Figure 5 in transverse cross section being taken in the same plane as the part of Figure 4 in transverse cross section;

Figure 6 is a somewhat diagrammatic elevational view of a portion of the apparatus shown in Figure 5;

Figure 7 is a fragmentary longitudinal cross sectional view such as would be taken on the line VII—VII of Figure 1 but with the mold forming mandrel and the mandrel support in operative or advanced positions;

Figure 1:
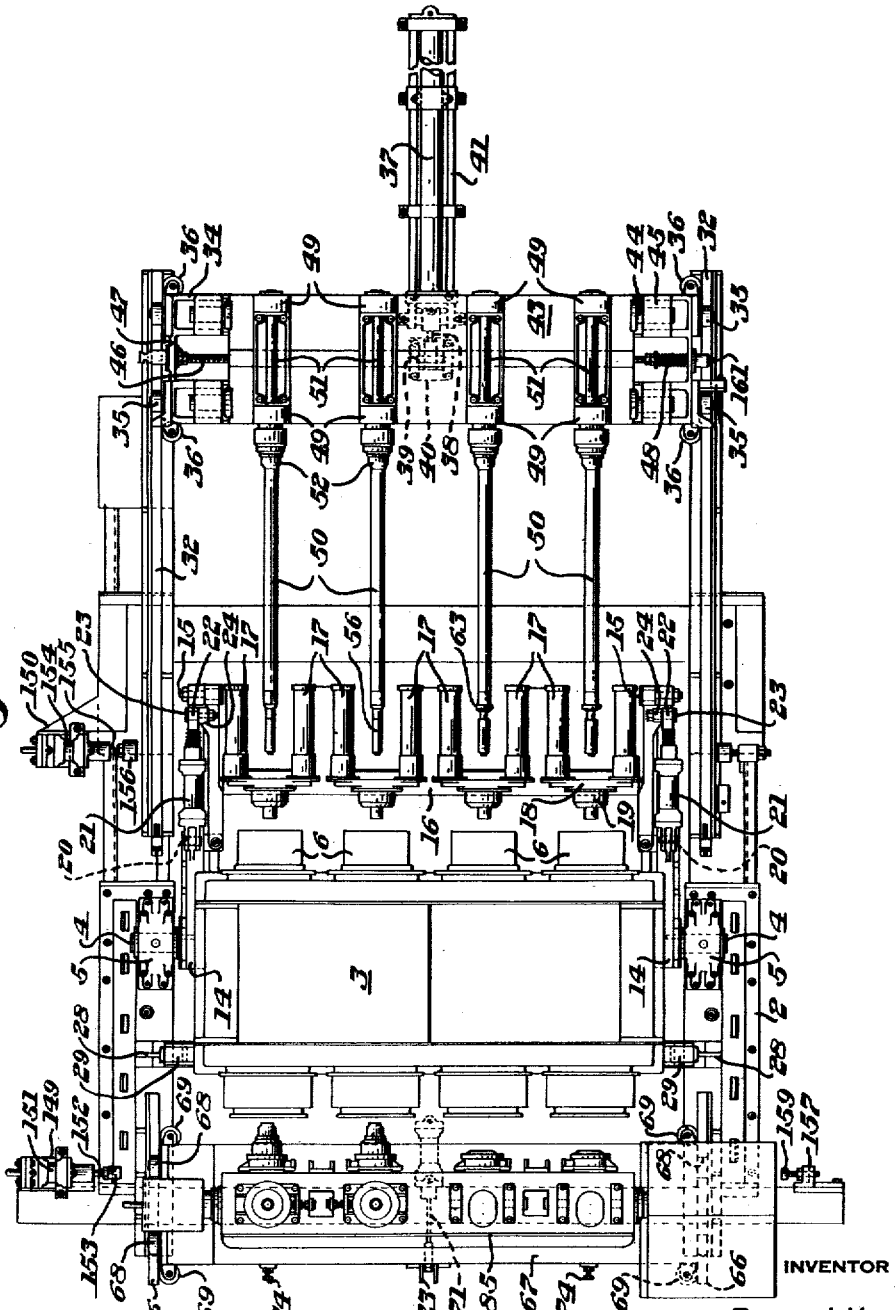
Figure 1 is a plan view of centrifugal casting apparatus, the lower half of the apparatus as shown in that figure being adapted for the casting of single hub pipe and the upper half being adapted for the casting of double hub pipe.

Referring now more particularly to the drawings, the apparatus is mounted upon a base 2 and comprises a flask cradle 3 having coaxial trunnions 4 mounted for turning movement in bearings 5 so that the cradle 3 is mounted for turning movement in a vertical plane perpendicular to the common axis of the trunnions 4.

The cradle 3 may carry any desired number of rotatable flasks in side-by-side relationship with their axes parallel and coplanar. In the structure shown the cradle 3 carries four flasks 6. Each of the flasks 6 has its own driving motor 7 mounted in the cradle beneath the flask, each of the driving motors driving its flask through a suitable driving connection such for example as a series of V-belts trained about pulleys on the flask and motor shaft respectively.

Connected with the cradle are two brackets 8 to each of which is pivoted at 9 a piston rod 10 carrying a piston operable within a cylinder 11 pivoted at 12 to a bracket 13 carried by the base 2. Means are provided for admitting fluid under pressure to the cylinders 11 selectively at opposite sides of the pistons therein for swinging the cradle 3 between a position as shown in the drawings in which the axes of the flasks are generally horizontal and a position turned clockwise from the position of Figure 2 through generally a right angle in which the axes of the flasks are generally upright. The base 2 carries two pedestals 28 respectively cooperating with positioning members 29 carried by the cradle 3 to accurately position the cradle in the position in which it is shown in the drawings with the axes of the flasks generally horizontal. When the cradle is swung to the position in which the axes of the flasks are generally vertical two pads 30 on the cradle engage stop members 31 on the base 2 to limit turning movement of the cradle and position it at a desired angle.

Mounted on each end of the cradle 3 is a bracket 14. The two brackets 14 are alike and extend generally longitudinally of the apparatus toward the right viewing Figures 1 and 2. Pivoted to the brackets 14 and 15 is a core holder support 16 which carries eight cylinders 17. Pistons operating in the cylinders 17 are connected together in pairs by crossheads 18, each of the crossheads 18 carrying a core holder 19 rotatably mounted on the crosshead. The core holders 19 are respectively disposed with their axes in the same longitudinal vertical planes as the axes of the flasks 6.

Mounted atop each of the brackets 14 and pivoted thereto at 20 is a cylinder 21 within which operates a piston whose piston rod 22 is pivoted at 23 to a projection 24 carried by the core holder support 16. Means are provided for admitting fluid under pressure within the cylinders 21 to turn the core holder support 16 about the common axis of the pivots 15 between a position in which the core holders 19 are coaxial with the flasks 6 and a position in which the core holders 19 are swung out of coaxial relationship with the flasks as indicated in chain lines at 25 in Figure 2. Fluid under pressure is admitted within the cylinders 17 to move the core holders 19 into and out of the ends of the flasks 6 when the core holders are coaxial with the flasks. When the core holders are swung up to the chain line position indicated at 25 in Figure 2 the core holder support clears the ends of the flasks to permit entry thereinto of mandrels presently to be described whose function is to form and compact in the flasks mold forming material, such, for example, as sand, to make in the flasks molds for the centrifugal casting of lengths of pipe. The structure and operation of the core holder support 16 and the core holders 19 do not constitute the present invention, being claimed in copending application Serial No. 297,711, filed July 8, 1952, now Patent No. 2,729,865.

Pivoted to the cradle 3 about a common axis 26 are mold stampers 27, one for cooperation with each of the four flasks, for stamping in the mold formed in the flask data to be cast in the pipes, the stampers and their operating mechanism being covered in copending application Serial No. 206,690, filed January 18, 1951, now Patent No. 2,685,834.

The present invention is not concerned with the operations which are performed when the cradle is in position with the axes of the flasks generally upright. However, it may be remarked that, similarly to the apparatus of Patent No. 2,449,900, the cradle is swung to position the flasks with their axes generally upright with the bottoms of the flasks closed by the core holders 19 but without any cores thereon while the flasks are being filled with mold forming material. Thereupon the cradle is turned to position the flasks with their axes generally horizontal as shown in the drawings and the flasks are rotated to cause the mold forming material by centrifugal action to be somewhat consolidated against the inner walls of the flasks, forming within each incipient mold a generally central longitudinal opening through which a mandrel presently to be described is inserted to further compact the mold forming material and shape the mold.

Figure 2:
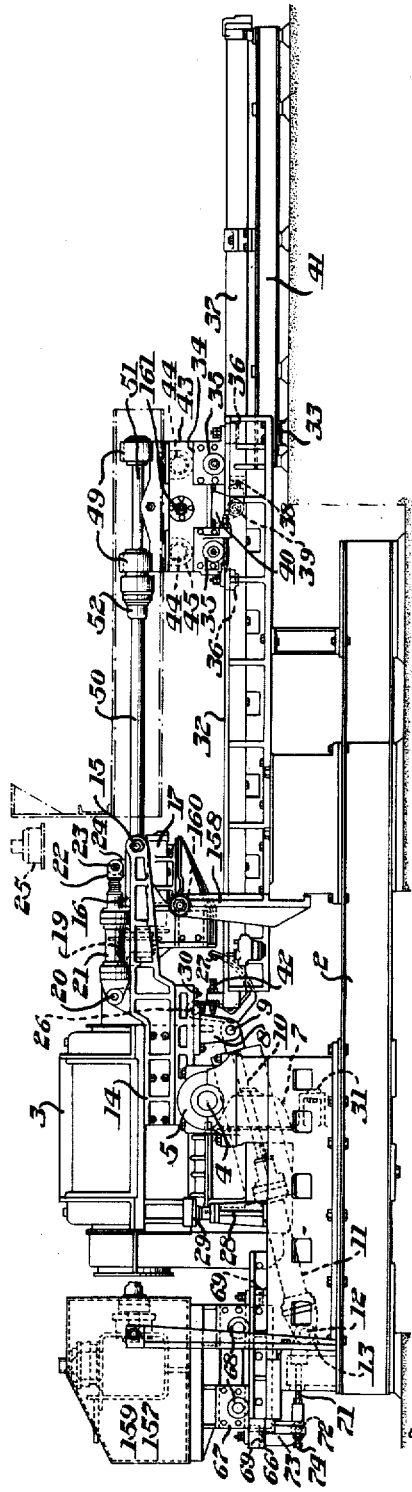
Figure 2 is a side elevational view of the apparatus adapted for the casting of double hub pipe.

Carried by the base 2 are parallel longitudinal rails 32 which project somewhat to the right of the base 2 viewing Figures 1 and 2 and have their ends supported at 33. Mounted for movement along the rails 32 is a carriage 34 having wheels 35 riding atop the rails 32 and rollers 36 engaging the inner faces of the rails to accurately position the carriage transversely of the rails. The carriage 34 is moved along the rails by a piston operating in a cylinder 37, the piston rod 38 being connected by a pin 39 to a bracket 40 connected with the under side of the carriage. The cylinder 37 is supported by a supporting structure 41. Forward movement of the carriage, i. e., movement toward the left viewing Figures 1 and 2, is limited by adjustable stops 42. Rearward movement of the carriage, i. e., movement toward the right viewing Figures 1 and 2, is limited by the piston in the cylinder 37 reaching the end of its stroke.

Mounted on the carriage 34 for movement transversely thereof is a mandrel support 43. At each end the mandrel support 43 has two horizontal parallel projecting pins 44 entering sockets 45 carried by the carriage. The four pins 44 operating in the respective sockets 45 insure controlled transverse movement of the mandrel support 43 while the mandrels presently to be described which are carried by the support are maintained at all times with desired orientation. The carriage 34 carries an adjustable stop member 46 shown as being in the form of a bolt which is maintained in its adjusted position by nuts 47. The mandrel support 43 is urged toward the stop 46 by a compression coil spring 48. The stop member 46 is adjusted so that when the mandrel support is in position thereagainst as shown in Figure 1 the mandrels now to be described have their axes respectively in the vertical planes containing the axes of the flasks 6.

The mandrel support 43 has four sets of aligned bearings 49 in each of which is rotatably supported a mandrel 50. Each mandrel 50 has a rearward portion 51 disposed within the bearings by which the mandrel is rotatably supported and an enlargement or hub 52 for forming in the mold at one end of the flask an enlargement wherein a hub at one end of the pipe length cast in the mold is formed.

Figure 8:
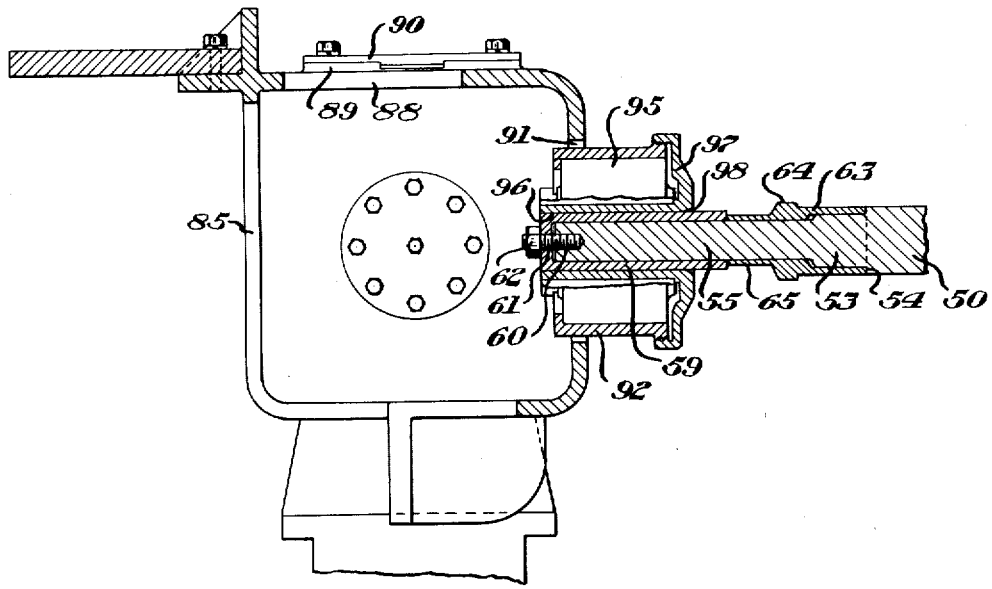
Figure 8 is a view similar to the upper portion of Figure 7 but showing the apparatus set up for the making of single hub pipe.

The forward end of each mandrel 50 is designed to selectively accommodate means for use when single hub pipe is being cast and means for use when double hub pipe is being cast. Referring to Figures 7 and 8, the forward end of each mandrel 50 has a reduced portion 53 forming with the body of the mandrel a shoulder 54. Beyond the reduced portion 53 is a further reduced portion 55. A sleeve is introduced over the portion 55 and the portion 53 so as to abut against the shoulder 54, the shape of the sleeve being determined by whether single hub pipe or double hub pipe is to be cast. In Figure 7 the sleeve is designated 56 and has an enlarged portion 57 whose extremity engages the shoulder 54 and which fits snugly about the portion 53 of the mandrel and a reduced portion 58 which fits snugly about the portion 55 of the mandrel. The outer surfaces of the portions 57 and 58 are cylindrical, the outer surface of the portion 57 being of the same diameter throughout as the outer surface of the body of the mandrel 50. The sleeve 56 is held in place on the mandrel by a cap 59 fitting snugly over the end of the portion 55 and maintained in place by a stud 60 threaded into the end of the mandrel and passing through a bore 61 in the head of the cap, a holding nut 62 being threaded onto the stud 60 and bearing against the end of the cap.

A sleeve 56 is used on each mandrel 50 when double hub pipe is being cast as will presently be explained. When single hub pipe is being cast each sleeve 56 is replaced by a sleeve 63 shown in Figure 8. The sleeves 63 differ from the sleeves 56 in that each sleeve 63 has an annular outward projection 64 at the left-hand extremity of the larger portion of the sleeve, the projection 64 being for the purpose of forming in the mold a depression for casting the spigot at the end of a length of single hub pipe opposite the end at which the hub or bell of the pipe is disposed. Likewise the portion of the sleeve 63 to the left of the projection 64 viewing Figure 8, which portion is designated 65, is of smaller external diameter than the portion 58 of the sleeve 56. This is to insure formation in the mold of an adequate dam beyond the depression in which the pipe spigot is formed so that the molten material of which the pipe is being cast will not flow out of the end of the mold.

The base 2 carries adjacent the left-hand ends of the flasks viewing Figures 1 and 2 parallel rails 66 on which is mounted for movement generally parallel to the axes of the flasks when in generally horizontal position a carriage 67. The carriage 67 has wheels 68 riding atop the rails 66 and rollers 69 engaging the inner faces of the rails to position the carriage transversely of the rails for accurate movement therealong.

Carried by the base 2 substantially at the longitudinal center line thereof is a cylinder 70 arranged with its axis generally horizontal and generally parallel to the length of the apparatus in which operates a piston whose piston rod 71 is connected at 72 to a downwardly projecting bracket 73 carried by the carriage 67. Thus operation of the piston in the cylinder 70 causes movement of the carriage 67 along the rails 66. Movement of the carriage toward the right viewing, for example, Figure 7 is limited by a pair of adjustable stop members 74 which engage portions 75 of the base 2. Movement of the carriage 67 in the opposite direction is limited by the piston in the cylinder 70 reaching the end of its stroke.

Figure 9:
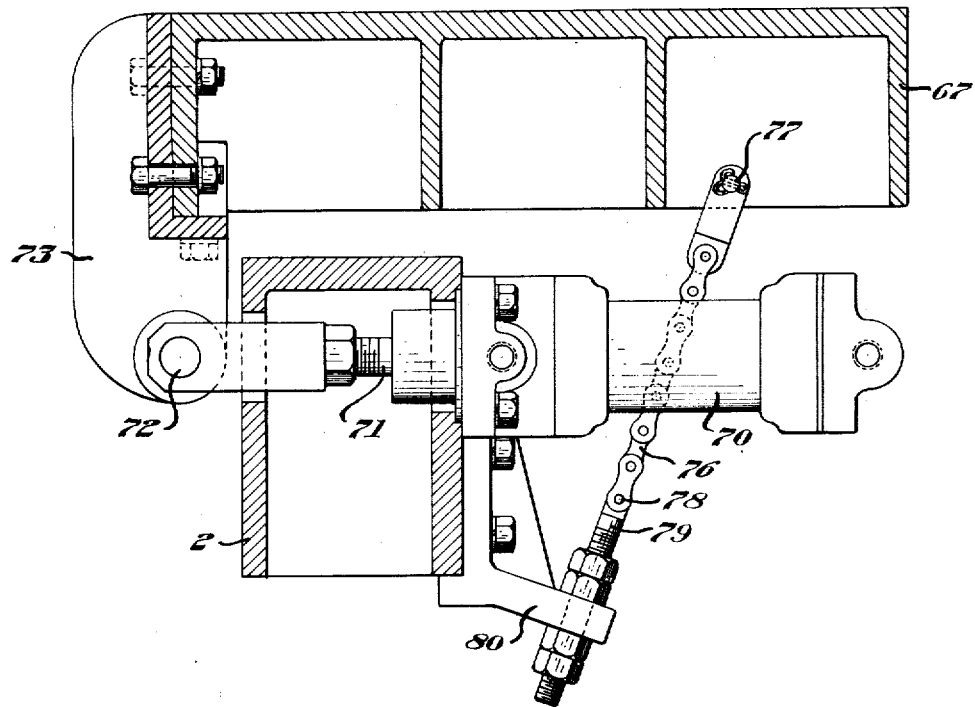
Figure 9 is a fragmentary longitudinal cross sectional view through a portion of the apparatus.

A pair of flexible tension elements shown as being in the form of chains 76 are each connected at one end at 77 to the carriage 67 and at the other end at 78 to an adjustable connector 79 carried by a bracket 80 connected to the base 2. The chains 76 are slack when the carriage is in its outward position, i. e., the position toward the left viewing Figures 1 and 2, in which the carriage is relatively remote from the cradle 3. When, however, the carriage is moved toward the cradle 3 and the flasks 6 carried thereby the chains 76 become taut at the time when the adjustable stop members 74 engage the portions 75 of the base 2. Thus the chains act as tension struts resisting forces tending to tilt the carriage toward the left viewing Figure 9. Such forces may be applied to the carriage when the mandrels come into engagement with means presently to be described which are carried upon the carriage. Employment of the chains 76 has an advantage over the use of hold-down rollers engaging the bottom surfaces of the tracks 66 as use of such hold-down rollers would promote binding in the event, for example, that mold forming material should come to rest upon the tracks.

The carriage 67 is of generally U shape as shown in Figure 3 and carries at one side a bracket 81 having therein a bearing 82. At the other side the carriage 67 has a bracket 83 having therein a bearing 84. The bearings 82 and 84 are coaxial. Mounted in the bearings 82 and 84 is a carrier 85. The carrier has a trunnion 86 disposed in the bearing 82 and a trunnion 87 disposed in the bearing 84. The carrier is turnable about the axes of the trunnions and also translatable axially of the trunnions as will presently be described.

The body of the carrier 85 is of generally hollow shape as shown in Figures 7 and 8. In the position in which the carrier is shown in those figures the wall of the carrier which is disposed toward the cradle 3 has four circular openings 91 therein, such openings being respectively substantially coaxial with the flasks. Applied to the carrier 85 at each of the openings 91 is a bearing bracket 92. Each bearing bracket 92 has opposed flange portions 93 through which it is bolted by bolts 94 to the carrier. Disposed within each bearing bracket 92 is a bearing unit 95 of any suitable type, such, for example, as a Dodge bearing unit. Each bearing unit 95 may be maintained within its bearing bracket 92 by being pressed therein. Each bearing unit 95 has a generally cylindrical opening therethrough as known to those skilled in the art for receiving a rotatable machine part.

I provide for rotatably mounting in each of the bearing units 95 a rotating part whose form is determined by whether the pipe being cast is single hub pipe or double hub pipe. The rotating part is in the form of a flanged sleeve 96 serving as a pilot or mandrel support as shown in Figure 8 when single hub pipe is being cast. The flange of the pilot is designated 97 and serves as a guard to prevent mold forming material from getting into the bearing unit. The bore of the pilot is such as to snugly and guidingly receive the mandrel cap 59 as shown in Figure 8. The mouth of the pilot bore is somewhat enlarged or beveled as shown at 98 to facilitate entry of the end of the mandrel thereinto. The pilot supports the end of the mandrel while the mandrel is performing its mold forming function.

When double hub pipe is being cast the pilot 96 is replaced by a combination pilot and hub 99 as shown in Figure 7. The combination pilot and hub 99 may be formed in one piece as shown or in two pieces bolted or otherwise fastened together. The hub portion is designated 100 and projects axially from the pilot portion as shown in Figure 7. The hub 100 is adapted to be engaged by the forward portion of the mandrel when the mandrel is introduced into the flask and to lie within the flask to form therein an enlarged end of a mold of compacted mold forming material to form one of the hubs on the pipe being cast. The nose of the hub 100 is tapered as shown at 101 and has a bore 102 of such size as to snugly receive the portion 57 of the sleeve 56 as shown in Figure 7. The rearward portion of the hub 100 is hollowed and has passages 103 to permit mold forming material pushed into the hub by the end of the mandrel to be discharged centrifugally upon rotation of the mandrel and hub.

The axial distance from the end of the mandrel to the tapered shoulder between the portions 57 and 58 of the sleeve 56 is greater than the axial distance between the extremity of the hub 100 and the mouth of the pilot. This is to insure that the mandrel will be in guided relationship to the pilot when the portion 57 of the sleeve 56 enters the hub 100 whereby to avoid damage to the hub.

In the position in which the carrier 85 is shown in Figures 7 and 8 it has at the top four openings 88 disposed respectively with their centers approximately in the vertical longitudinal planes containing the axes of the four flasks 6. Each of the openings 88 is flanked on both sides by pads 89 for the application of a core holder when double hub pipe is to be cast. When single hub pipe is to be cast no core holder is used and the pads 89 are covered and protected by cover plates 90.

As explained above the carrier 85 is turnable about the common axis of the trunnions 86 and 87. Its first angular position in the cycle of operations is that shown in Figures 7 and 8 in which the mandrel pilots are disposed substantially coaxially with the mandrels. After formation of the molds the carrier is adapted to be turned through an angle of 90° in the clockwise direction viewing Figures 7 and 8 to position the flasks. If single hub pipe is being cast pouring boots for introducing molten material to be cast in the molds are introduced through the then open top of the carrier and through the openings 88 to introduce the molten material into the flasks. When double hub pipe is being cast a core holder 104 is rotatably mounted on the carrier 85 at each of the openings 88 by being bolted to the carrier at the pads 89. As shown in Figure 7 each of the core holders has a hollow cylindrical core receiving portion 105 through which the pouring boot is adapted to be projected when the molten material to be cast is to be introduced into the mold.

As shown in Figure 5 the trunnion 87 of the carrier 85 has a reduced extension 106 into which is threaded at 106a a rod 107 which passes freely through a central bore in a speed reducer 108 mounted on the carriage 67. The speed reducer 108 is driven through a shaft 109 carrying a sprocket 110 by a sprocket chain 111 driven by a fluid motor 112.

The trunnion extension 106 is of rectangular cross-sectional shape as shown in Figure 6 and has mounted thereon opposed brackets 113 fastened together by bolts 114, each bracket carrying a stud 115 on which is journaled a roller 116. The speed reducer 108 has a hollow shaft 117 through which the rod 107 passes, the hollow shaft 117 carrying a collar 118 having axially projecting lugs 119 in opposed pairs, each of the rollers 116 being received between the lugs of one of such pairs of lugs. Thus turning of the speed reducer shaft 117 causes turning of the carrier 85 while at the same time providing for axial movement of the carrier 85 relatively to the speed reducer.

Figure 10:
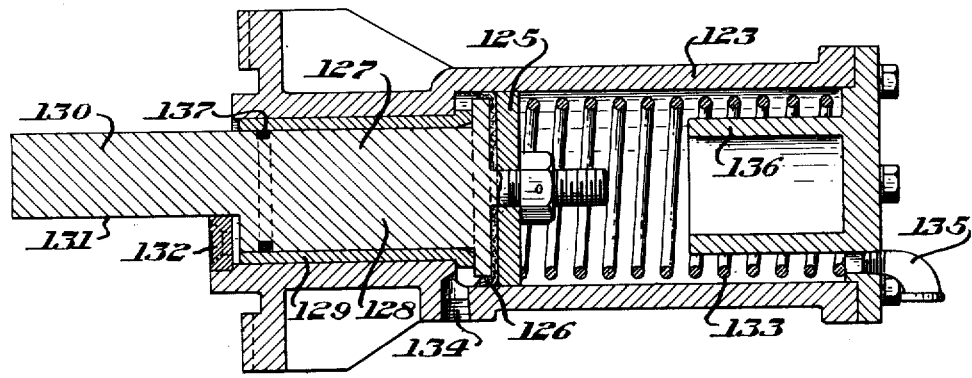
Figure 10 is a fragmentary longitudinal cross sectional view through a portion of the apparatus.

Fastened to the trunnion 87 is a radial arm 120 at the extremity of which is journaled a roller 121. The carriage 67 has a bracket 122 carrying two cylinders 123 and 124. The cylinders 123 and 124 and the means operated thereby are identical so description of one will suffice for both. Referring to Figure 10, the cylinder 123 has mounted therein a piston 125 sealed therein by a cup leather 126. Connected to the piston 125 is an extension 127 having a cylindrical portion 128 slidable in a bronze bearing 129 and a non-cylindrical terminal portion 130 projecting therefrom. The portion 130 has a flat face 131 operating against a guide 132 to prevent turning of the extension 127. The piston is normally urged outwardly or toward the left viewing Figure 10 by a compression coil spring 133 but may be retracted by admitting fluid pressure to the left of the piston through a port 134. The interior of the cylinder to the right of the piston viewing Figure 10 is open to the outside through a vent 135. Within the cylinder is a stop member 136 which limits movement of the piston toward the right viewing Figure 10. The extension 127 is sealed to the bearing 129 by an O-ring 137.

The cylinders 123 and 124 are positioned so that when the respective piston extensions thereof are projected they are disposed in the path of the roller 121 as the carrier 85 turns about the axes of its trunnions. The cylinders 123 and 124 are positioned so that when their pistons are projected the carrier is stopped in desired angular positions. The cylinder 123 is positioned to stop the carrier in the angular position shown in Figures 7 and 8. The cylinder 124 is positioned to stop the carrier in an angular position turned 90° in the clockwise direction from the position in which the carrier is shown in Figures 7 and 8.

The trunnion 86 has an extension 138 having a threaded portion 139 on which is threaded a nut 140 having a ring 141 welded thereto. The ring 141 has an annular projection 142. The nut 140 is maintained in desired adjusted position on the threaded portion 139 by a lock nut 143. Disposed about the trunnion extension 138 is a bearing 144 into which the projection 142 extends and which is received within the outer end of a spring guide 145. A compression coil spring 146 is disposed about the extension 138 and bears at its left-hand end viewing Figure 4 against the spring guide 145 and at its right-hand end against a thrust washer 147 carried by the bracket 81. Thus the spring 146 urges the carrier 85 toward the left viewing Figure 4.

Disposed about the trunnion 86 is a bearing 148 which with the parts in the position shown in Figure 4 lies between and in contact with each of the brackets 81 and the left-hand end of the carrier 85. Thus the bearing 148 limits movement of the carrier 85 to the left viewing Figure 4 due to the action of the spring 146 while providing for turning of the carrier relatively to the bracket 81.

When the mandrels are in their operative positions within the flasks 6 the mandrels and the mandrel supports or pilots are moved transversely of the axes of the flasks to compact in the flasks the mold forming material disposed therein. This is true whether single hub pipe or double hub pipe is being cast. Provision is made for separately moving the mandrel support 43 and the carrier 85 transversely of the axes of the flasks when the mandrel support and the carrier are both in their inward or operative positions. I provide two brackets 149 and 150 mounted upon the base 2. The bracket 149 carries a cylinder 151 disposed with its axis extending transversely of the apparatus and within which operates a piston having a piston rod 152 carrying at its extremity a pusher 153. The bracket 150 carries a cylinder 154 disposed with its axis extending transversely of the apparatus and within which operates a piston having a piston rod 155 carrying at its extremity a pusher 156. The cylinder 151 is disposed so that when the carrier 85 is in its inward or operative position the end of the trunnion extension 138 will be disposed in transverse alignment with the pusher 153. The cylinder 154 is disposed so that when the mandrel support 43 is in its inward or operative position the end of the stop member 46 will be disposed in transverse alignment with the pusher 156.

Mounted on the base 2 respectively opposite the cylinders 151 and 154 are brackets 157 and 158. Adjustably mounted in the bracket 157 is a stop member 159 which lies opposite the end of the rod 107 when the carrier 85 is in its inward or operative position. Adjustably mounted in the bracket 158 is a stop member 160 which lies opposite a projection 161 on the mandrel support 43 when the mandrel support 43 is in its inward or operative position.

I shall now describe a cycle of operations of my centrifugal casting apparatus. Initially the mandrel support 43 is in its extreme right-hand position viewing Figure 1 and the carrier 85 is in its extreme left-hand position viewing Figure 1 so as to permit the cradle 3 carrying the four flasks 6 to be turned about the common axis of the trunnions 4 to the position in which the flasks are generally upright. The core holders 19 are moved against the lower ends of the flasks to close the flasks at their bottoms and prevent mold forming material introduced into the upper ends thereof from falling out. Mold forming material is introduced into the upper ends of the flasks. The flasks are rotated about their respective axes and the cradle 3 is turned about the common axis of the trunnions 4 to the position of Figures 1 and 2 in which the axes of the flasks are generally horizontal. The rotation of the flasks causes the mold forming material therein to be somewhat compacted or consolidated by centrifugal action against the inside walls of the flasks, thereby forming through the mold forming material in each flask a generally central passage.

The core holders 19 are withdrawn from the flasks by fluid pressure operating in the cylinders 17. Thereupon through fluid pressure operating in the cylinders 21 the core holder support 16 is turned about the common axis of the pivots 15 to the position in which the core holders are disposed as indicated in chain lines at 25 in Figure 2 so as to clear the flasks for entry thereinto of the mandrels 50.

Through fluid pressure acting in the cylinder 37 and with the mandrels maintained axially of the flasks by the spring 48 the mandrel support 43 carrying the mandrels is moved toward the left viewing Figures 1 and 2 so that the mandrels enter the openings in the partially consolidated mold forming material in the flasks. If single hub pipe is being cast each mandrel is provided with a sleeve 63 while if double hub pipe is being cast each mandrel is provided with a sleeve 56.

As the mandrels are introduced into the flasks the carrier 85 is in the position shown in Figures 7 and 8. If single hub pipe is being cast the carrier 85 is equipped as shown in Figure 8 while if double hub pipe is being cast the carrier 85 is equipped as shown in Figure 7. For present purposes it will be assumed that double hub pipe is being cast and the description will proceed accordingly. From the above description of the apparatus and from the present description of operation the steps employed in the formation of single hub pipe will be understood.

With the carrier 85 oriented as shown in Figure 7 the carriage 67 is moved toward the right viewing Figures 1 and 2 by the operation of fluid under pressure in the cylinder 70. The movement of the carriage 67 to the right is limited by engagement of the stop members 74 with the portions 75 of the base 2. At the same time the movement of the mandrel support 43 toward the left is limited by the adjustable stop members 42. As the mandrels 50 and the hubs 100 approach each other the reduced extremity of each mandrel passes freely through the corresponding hub until it enters into guided relationship with the pilot 99. After the front end of the mandrel has entered into guided relationship with the pilot 99 the portion 57 of the sleeve 56 enters the duced extremity of the hub 100 until the mandrel, pilot and hub assume the relationship shown in Figure 7. While the respective mandrels and hubs are thus being introduced into the flasks and into cooperative relationship with each other the flasks are preferably rotating. After the mandrels and hubs reach the relative position shown in Figure 7 rotation of the flasks is continued, or, if the flasks have not been rotating, is commenced, and the mandrel support 43 and the carrier 85 are moved transversely by fluid under pressure in the cylinders 151 and 154 until such movement is limited by the stop members 159 and 160. Such transverse movement of the mandrels and hubs compacts the mold forming material in the flasks and forms the molds therein. While the molds are being thus formed the mandrels and hubs as well as the mandrel supports or pilots turn through their engagement with the mold forming material. Such turning is promoted by mounting of the mandrels and the pilots and hubs on anti-friction bearings.

After the molds have been formed as just described fluid pressure is released within the cylinders 151 and 154 and the springs 146 and 148 respectively return the carrier 85 and mandrel support 43 to their normal positions in which the respective mandrels and hubs are coaxial with the flasks. Thereupon the mandrel support 43 is moved back toward the right viewing Figures 1 and 2 to its original inoperative position and the carriage 67 is moved back toward the left to its original inoperative position.

As above mentioned, the motor 112 is a fluid motor which may operate continuously, exerting a constant torque through the speed reducer 108 upon the collar 118 and thus through the lugs 119 and the rollers 116 constantly tending to turn the carrier 85 about the common axis of its trunnions 86 and 87. When the carrier 85 is in the position shown in Figure 7 it is maintained in that position by engagement of the roller 121 with the piston in the cylinder 123. As explained above, axial movement of the carrier 85 is permitted since the rod 107 moves freely within the speed reducer 108 and the roller 121 rolls along the flat face of the extension of the piston operating in the cylinder 123. Also, the rollers 116 roll along the lugs 119.

After the carriage 67 has been withdrawn toward the left viewing Figures 1 and 2 to its inoperative position the piston in the cylinder 123 is withdrawn inwardly permitting the fluid motor 112 through the speed reducer 108 and the other mechanism above described to turn the carrier 85 in the clockwise direction viewing Figure 6. The piston in the cylinder 124 is projected into the path of the roller 121 and when the roller 121 strikes that piston turning movement of the carrier 85 stops, this time with the core holders 104 in alignment with the flasks. Preferably cores have been applied over the core receiving portions 105 of the core holders 104 while the carrier 85 is in the position of Figure 7. When the carrier is turned to the right viewing that figure through 90° as just described the cores are positioned ready for entry into the left-hand ends of the flasks 6. Thereupon the carriage 67 is moved toward the right viewing Figures 1 and 2 to position the cores in the left-hand ends of the flasks.

The core holder support 16 is swung back to the position of Figures 1 and 2 with the core holders 19 ready to enter the right-hand ends of the flasks 6. Preferably while the core holders 19 are in the position indicated by chain lines at 25 in Figure 2 cores are applied thereto so that when the core holder support 16 is turned down to the position of Figures 1 and 2 the cores are ready to enter the flasks. The core holders 19 are moved toward the left viewing Figures 1 and 2 by the operation of fluid under pressure in the cylinders 17, thus positioning the cores on the core holders 19 in the right-hand ends of the flasks viewing Figures 1 and 2.

Pouring boots are introduced through the core holders 104 and molten material, such, for example, as iron or steel, to be cast into lengths of pipe is flowed into the molds through the pouring boots, the flasks at the same time being rotated at speeds such as to cause the molten material to form hollow lengths of pipe against the molds in the flasks. Rotation of the flasks is continued until the molten material has sufficiently solidified. Thereupon the core holders 19 and 104 are withdrawn, the cradle 3 is tilted to generally upright position and the pipe lengths formed in the flasks are ejected downwardly through the lower ends of the flasks by exerting pressure against the upper ends thereof. The parts are now in position for repetition of the cycle.

While I have described a present preferred method of practicing the invention and have illustrated one form of apparatus upon which the invention may be practiced it is to be distinctly understood that the invention is not limited thereto but may be otherwise variously practiced within the scope of the following claims.

I claim:

1. A method of forming a mold of compacted mold forming material comprising disposing at a fixed location an elongated flask, after the flask is so disposed guidedly moving separately from the flask a member into each end of the flask, said members collectively including a mandrel and a hub, interfitting said members within the flask, introducing mold forming material into the flask, rotating the flask and relatively guidedly moving said members as a unit on the one hand and the flask as another unit on the other hand transversely of the axis of the flask while said members are interfitted within the flask to compact the mold forming material.

2. A method of forming a mold of compacted mold forming material comprising introducing mold forming material into an elongated flask, rotating the flask at centrifugal speed to partially compact the mold forming material and form an opening therethrough, disposing the flask at a fixed location, after the flask is disposed at said fixed location guidedly moving separately from the flask a member into each end of the flask, said members collectively including a mandrel and a hub, interfitting said members within the flask and while rotating the flask relatively guidedly moving said members as a unit on the one hand and the flask as another unit on the other hand transversely of the axis of the flask while said members are interfitted within the flask to further compact the mold forming material.

3. A method of forming a mold of compacted mold forming material comprising introducing mold forming material into an elongated flask, rotating the flask at centrifugal speed to partially compact the mold forming material and form an opening therethrough, disposing the flask at a fixed location, after disposing the flask at said fixed location guidedly moving separately from the flask a mandrel into said opening at one end of the flask, guidedly moving separately from the flask a hub into the flask at the opposite end of the flask toward and into interfitting engagement with the forward end of the mandrel and while rotating the flask relatively guided moving the mandrel and hub as a unit on the one hand and the flask as another unit on the other hand transversely of the axis of the flask while the mandrel and hub are in interfitting engagement to further compact the mold forming material.

4. A method of forming a mold of compacted mold forming material comprising introducing mold forming material into an elongated flask, rotating the flask at centrifugal speed to partially compact the mold forming material and form an opening therethrough, disposing the flask at a fixed location, after disposing the flask at said fixed location guidedly moving separately from the flask a mandrel into said opening at one end of the flask, guidedly moving separately from the flask a hub into the flask at the opposite end of the flask toward the mandrel and introducing the forward end of the mandrel into the hub and while rotating the flask relatively guidedly moving the mandrel and hub as a unit on the one hand and the flask as another unit on the other hand transversely of the axis of the flask while the forward end of the mandrel is within the hub to further compact the mold forming material.

5. A method of forming a mold of compacted mold forming material for the casting of double bell end pipe comprising introducing mold forming material into an elongated flask, rotating the flask at centrifugal speed to partially compact the mold forming material and form an opening therethrough, disposing the flask at a fixed location, after disposing the flask at said fixed location guidedly moving separately from the flask into said opening at one end of the flask a mandrel with a first hub thereon at the rearward end of the mandrel so that said first hub enters the flask, guidedly moving separately from the flask a second hub into the flask at the opposite end of the flask toward and into interfitting engagement with the forward end of the mandrel and while rotating the flask relatively guidedly moving the mandrel and hubs as a unit on the one hand and the flask as another unit on the other hand transversely of the axis of the flask while the mandrel and the second hub are in interfitting engagement to further compact the mold forming material.

6. A method of forming a mold of compacted mold forming material comprising disposing in generally upright position an elongated flask, introducing mold forming material into the flask, rotating the flask at centrifugal speed to partially compact the mold forming material and form an opening therethrough, disposing the flask at a fixed location in generally horizontal position, with the flask so disposed guidedly moving separately from the flask into the flask a member from each end of the flask, said members collectively including a mandrel and a hub, interfitting said members within the flask and while rotating the flask relatively guidedly moving said members as a unit on the one hand and the flask as another unit on the other hand transversely of the axis of the flask while said members are interfitted within the flask to further compact the mold forming material.

References Cited in the file of this patent

UNITED STATES PATENTS

| Number | Name | Date |
|---|---|---|
| 278,663 | Ireton et al. | May 29, 1883 |
| 1,480,000 | McWane | Jan. 8, 1924 |
| 1,694,763 | Beatty | Dec. 11, 1928 |
| 1,794,527 | Mathieu | Mar. 3, 1931 |
| 1,942,919 | Eurich et al. | Jan. 9, 1934 |
| 1,959,227 | Barr et al. | May 15, 1934 |
| 2,402,555 | Jarchow | June 25, 1946 |
| 2,449,900 | Johnston | Sept. 21, 1948 |
| 2,512,071 | Nolan | June 20, 1950 |

FOREIGN PATENTS

| Number | Country | Date |
|---|---|---|
| 26,301 of 1905 | Great Britain | Nov. 29, 1906 |

UNITED STATES PATENT OFFICE

CERTIFICATE OF CORRECTION

Patent No. 2,796,645                                                      June 25, 1957

Paul J. Kaveny

It is hereby certified that error appears in the printed specification of the above numbered patent requiring correction and that the said Letters Patent should read as corrected below.

Column 9, line 41, for "duced" read --reduced--; column 11, line 25, for "guided" read --guidedly--.

Signed and sealed this 3rd day of September 1957.

(SEAL)
Attest:

KARL H. AXLINE

Attesting Officer                                                      ROBERT C. WATSON
                                                                                Commissioner of Patents